US012568117B2

(12) United States Patent
Kimura et al.

(10) Patent No.: US 12,568,117 B2
(45) Date of Patent: Mar. 3, 2026

(54) INFORMATION PROCESSING APPARATUS, METHOD FOR CONTROLLING THE SAME, AND STORAGE MEDIUM

(71) Applicant: CANON KABUSHIKI KAISHA, Tokyo (JP)

(72) Inventors: Tomohiro Kimura, Chiba (JP); Minoru Fujisawa, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 460 days.

(21) Appl. No.: 18/062,501

(22) Filed: Dec. 6, 2022

(65) Prior Publication Data

US 2023/0179636 A1 Jun. 8, 2023

(30) Foreign Application Priority Data

Dec. 8, 2021 (JP) ................................. 2021-199140

(51) Int. Cl.
| | |
|---|---|
| *H04L 9/40* | (2022.01) |
| *H04L 41/08* | (2022.01) |
| *H04L 61/5014* | (2022.01) |
| *H04N 1/00* | (2006.01) |

(52) U.S. Cl.
CPC .......... *H04L 63/20* (2013.01); *H04L 61/5014* (2022.05); *H04N 1/00427* (2013.01); *H04L 41/08* (2013.01); *H04N 2201/0037* (2013.01)

(58) Field of Classification Search
CPC ..... H04L 63/20; H04L 61/5014; H04L 41/08; H04L 61/4511; H04N 1/00427; H04N 2201/0037; H04N 1/00244; H04N 1/00344; H04N 1/0048; H04N 1/32561; H04N 1/00204; H04N 1/00912; H04N 1/00962; H04N 2201/0094
See application file for complete search history.

(56) References Cited

U.S. PATENT DOCUMENTS

| | | | | |
|---|---|---|---|---|
| 2004/0179211 A1 * | 9/2004 | Burkes | ................... | G06K 15/12 358/1.15 |
| 2023/0300265 A1 * | 9/2023 | Mizuno | .............. | H04N 1/00482 358/1.16 |

FOREIGN PATENT DOCUMENTS

| | | | | |
|---|---|---|---|---|
| DE | 19615190 A1 * | 10/1997 | ........... | G05B 19/052 |
| EP | 2890052 A1 * | 7/2015 | ......... | H04L 41/0886 |
| JP | 2004030165 A * | 1/2004 | | |
| JP | 2007185814 A | 7/2007 | | |
| JP | 2011065366 A | 3/2011 | | |
| JP | 2013156757 A * | 8/2013 | ............. | G06F 21/57 |

* cited by examiner

*Primary Examiner* — David R Lazaro
*Assistant Examiner* — Mariegeorges A Henry
(74) *Attorney, Agent, or Firm* — Canon U.S.A., Inc. IP Division

(57) ABSTRACT

An MFP as an information processing apparatus stores a setting data group as a combination of at least one setting item and a setting value corresponding to the at least one setting item for each of a plurality of division categories. The MFP acquires a plurality of network settings acquired from outside and/or set in the MFP. The MFP estimates the category corresponding to the use environment of the MFP from among the plurality of categories based on the plurality of obtained network settings. Lastly, the MFP changes operation settings of the MFP based on the setting data group stored in association with the estimated category.

9 Claims, 10 Drawing Sheets

FIG.1

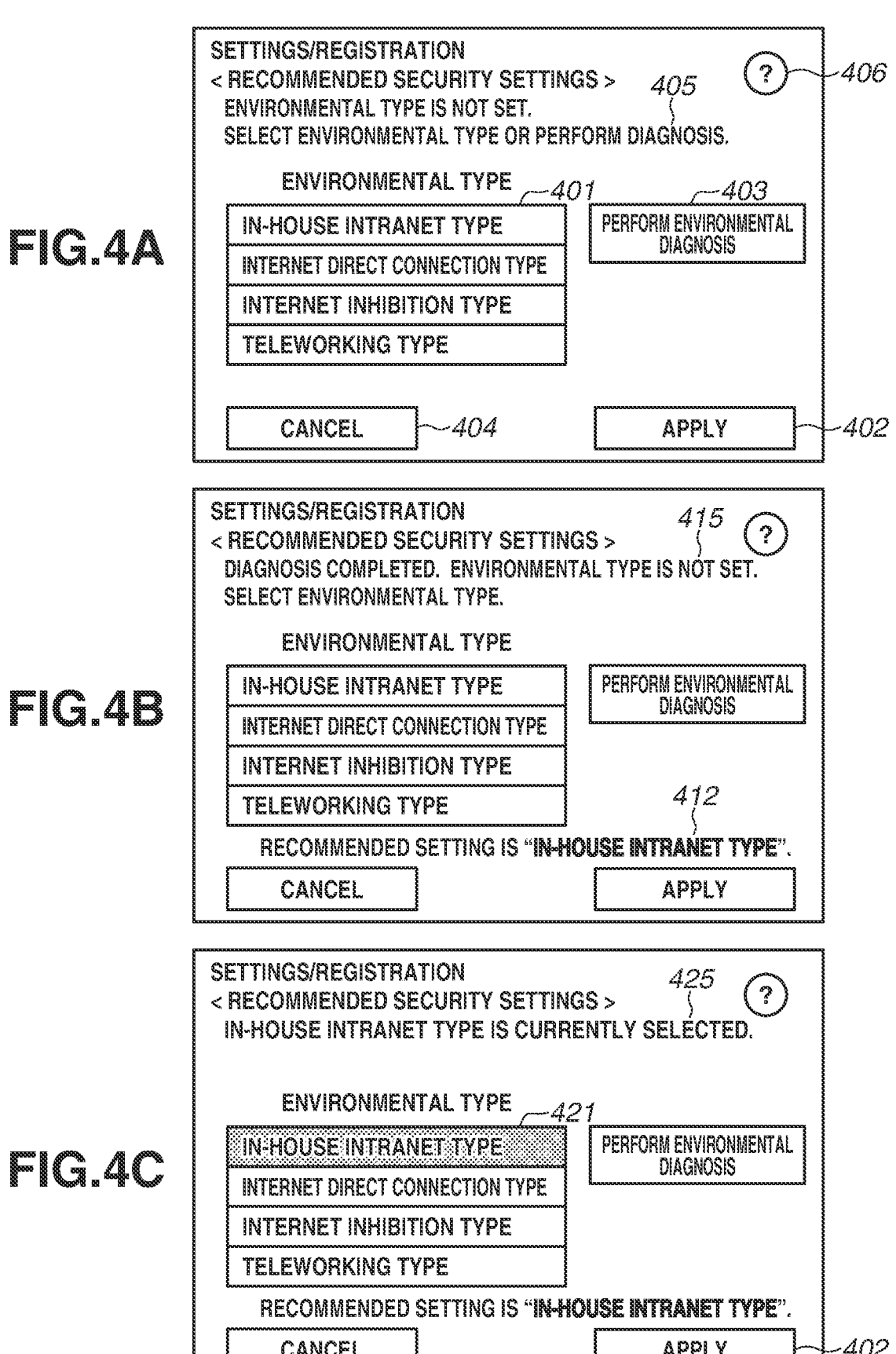

FIG.4A

SETTINGS/REGISTRATION
< RECOMMENDED SECURITY SETTINGS >     405     ⌢406
ENVIRONMENTAL TYPE IS NOT SET.
SELECT ENVIRONMENTAL TYPE OR PERFORM DIAGNOSIS.

ENVIRONMENTAL TYPE ⌐401          ⌐403

| IN-HOUSE INTRANET TYPE |
| INTERNET DIRECT CONNECTION TYPE |
| INTERNET INHIBITION TYPE |
| TELEWORKING TYPE |

PERFORM ENVIRONMENTAL DIAGNOSIS

CANCEL ⌐404          APPLY ⌐402

FIG.4B

SETTINGS/REGISTRATION
< RECOMMENDED SECURITY SETTINGS >     415
DIAGNOSIS COMPLETED.  ENVIRONMENTAL TYPE IS NOT SET.
SELECT ENVIRONMENTAL TYPE.

ENVIRONMENTAL TYPE

| IN-HOUSE INTRANET TYPE |
| INTERNET DIRECT CONNECTION TYPE |
| INTERNET INHIBITION TYPE |
| TELEWORKING TYPE |

PERFORM ENVIRONMENTAL DIAGNOSIS

412

RECOMMENDED SETTING IS "IN-HOUSE INTRANET TYPE".

CANCEL          APPLY

FIG.4C

SETTINGS/REGISTRATION
< RECOMMENDED SECURITY SETTINGS >     425
IN-HOUSE INTRANET TYPE IS CURRENTLY SELECTED.

ENVIRONMENTAL TYPE ⌐421

| IN-HOUSE INTRANET TYPE |
| INTERNET DIRECT CONNECTION TYPE |
| INTERNET INHIBITION TYPE |
| TELEWORKING TYPE |

PERFORM ENVIRONMENTAL DIAGNOSIS

RECOMMENDED SETTING IS "IN-HOUSE INTRANET TYPE".

CANCEL          APPLY ⌐402

FIG.10A

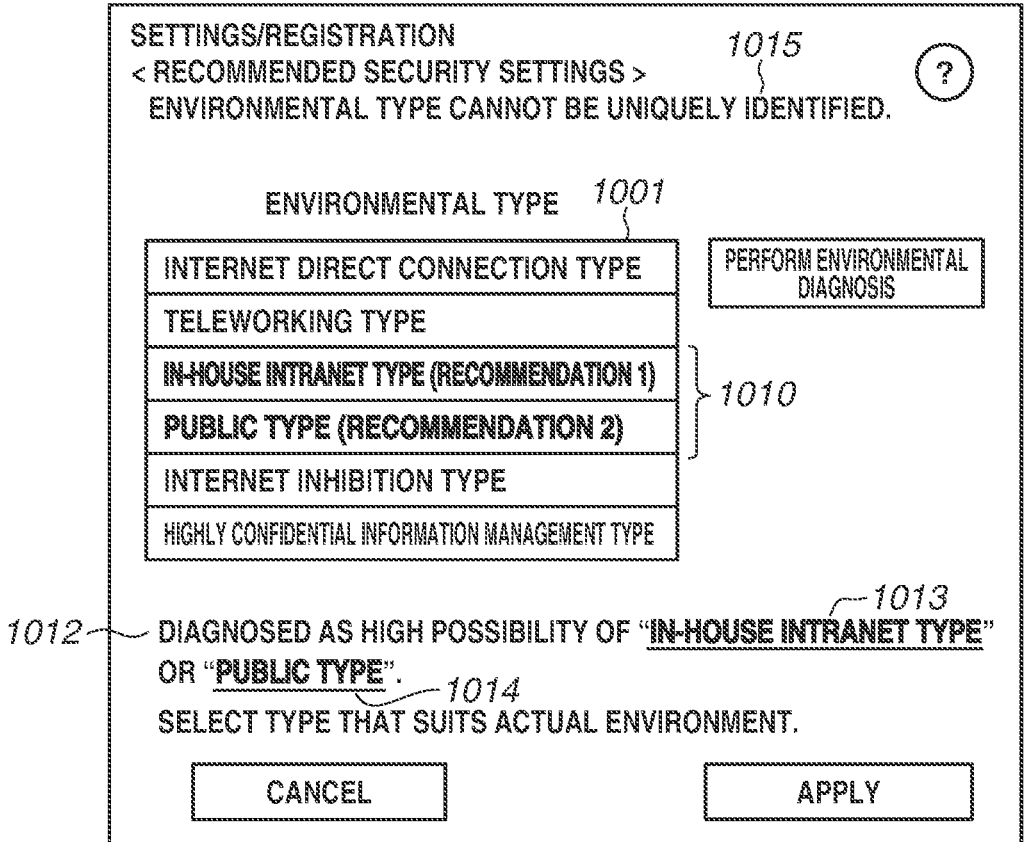

SETTINGS/REGISTRATION
< RECOMMENDED SECURITY SETTINGS >     *1015*
    ENVIRONMENTAL TYPE CANNOT BE UNIQUELY IDENTIFIED.          ( ? )

ENVIRONMENTAL TYPE     *1001*

| |
|---|
| INTERNET DIRECT CONNECTION TYPE |
| TELEWORKING TYPE |
| IN-HOUSE INTRANET TYPE (RECOMMENDATION 1) |
| PUBLIC TYPE (RECOMMENDATION 2) |
| INTERNET INHIBITION TYPE |
| HIGHLY CONFIDENTIAL INFORMATION MANAGEMENT TYPE |

*1010*

PERFORM ENVIRONMENTAL DIAGNOSIS

*1012* — DIAGNOSED AS HIGH POSSIBILITY OF "IN-HOUSE INTRANET TYPE"     *1013*
OR "PUBLIC TYPE".     *1014*
SELECT TYPE THAT SUITS ACTUAL ENVIRONMENT.

| CANCEL |     | APPLY |
|---|---|---|

| | |
|---|---|
| INTERNET DIRECT CONNECTION TYPE | |
| TELEWORKING TYPE | |
| IN-HOUSE INTRANET TYPE | ☆ |
| PUBLIC TYPE | ☆ |
| INTERNET INHIBITION TYPE | |
| HIGHLY CONFIDENTIAL INFORMATION MANAGEMENT TYPE | |

*1020*

INFORMATION PROCESSING APPARATUS, METHOD FOR CONTROLLING THE SAME, AND STORAGE MEDIUM

BACKGROUND

Field of the Disclosure

The present disclosure relates to an information processing apparatus that connects to a network.

Description of the Related Art

Generally, information processing apparatuses to be connected to a network are provided with a setting function as a function of making settings for security-related functions according to user operations. In recent years, information processing apparatuses have been installed in various environments such as public spaces shared by teleworkers and many unspecified persons, resulting in an increased complexity in required security settings.

Japanese Patent Application Laid-Open No. 2007-185814 discusses a technique in which a user specifies a stepwise security level to collectively make settings for security-related functions for a Multi Function Peripheral (MFP) corresponding to the security level.

There is a case where a user finds it difficult to select a suitable security level from displayed security levels, or a security level selected by the user is not suitable for the actual environment. In this case, there arises a problem that an information processing apparatus may possibly be operated with default settings (without security setting), operated with a security level not suitable for the environment, or operated in a state where security of the information processing apparatus is not ensured.

SUMMARY

Embodiments of the present disclosure have been devised in view of at least one of the above-described problems. According to an aspect of the present disclosure, some embodiments are directed to estimating a category corresponding to the use environment of the information processing apparatus based on network information, and providing a mechanism for utilizing the result of the estimation.

According to an aspect of the present disclosure, an image processing apparatus that manages different setting value groups associated with a plurality of use environments includes one or more memories, and one or more processors in communication with the one or more memories, wherein the one or more processors and the one or more memories cooperate to cause the image processing apparatus to accept a selection of one of a plurality of items associated with the plurality of use environments, accept an instruction to estimate a use environment of the image processing apparatus, upon reception of the estimation instruction, estimate a use environment of the image processing apparatus based on information acquired by the image processing apparatus, and issue a notification of a result of the estimation, wherein the result of the estimation is at least one use environment included in the plurality of use environments.

Further features of various embodiments will become apparent from the following description of exemplary embodiments with reference to the attached drawings.

BRIEF DESCRIPTION OF THE DRAWINGS

FIG. 1 illustrates an example of an information processing system.

FIGS. 4A to 4C illustrate examples of screens displayed on an operation unit of the MFP.

FIGS. 10A and 10B illustrate examples of screens displayed on the operation unit of the MFP.

DESCRIPTION OF THE EMBODIMENTS

Figure 2:
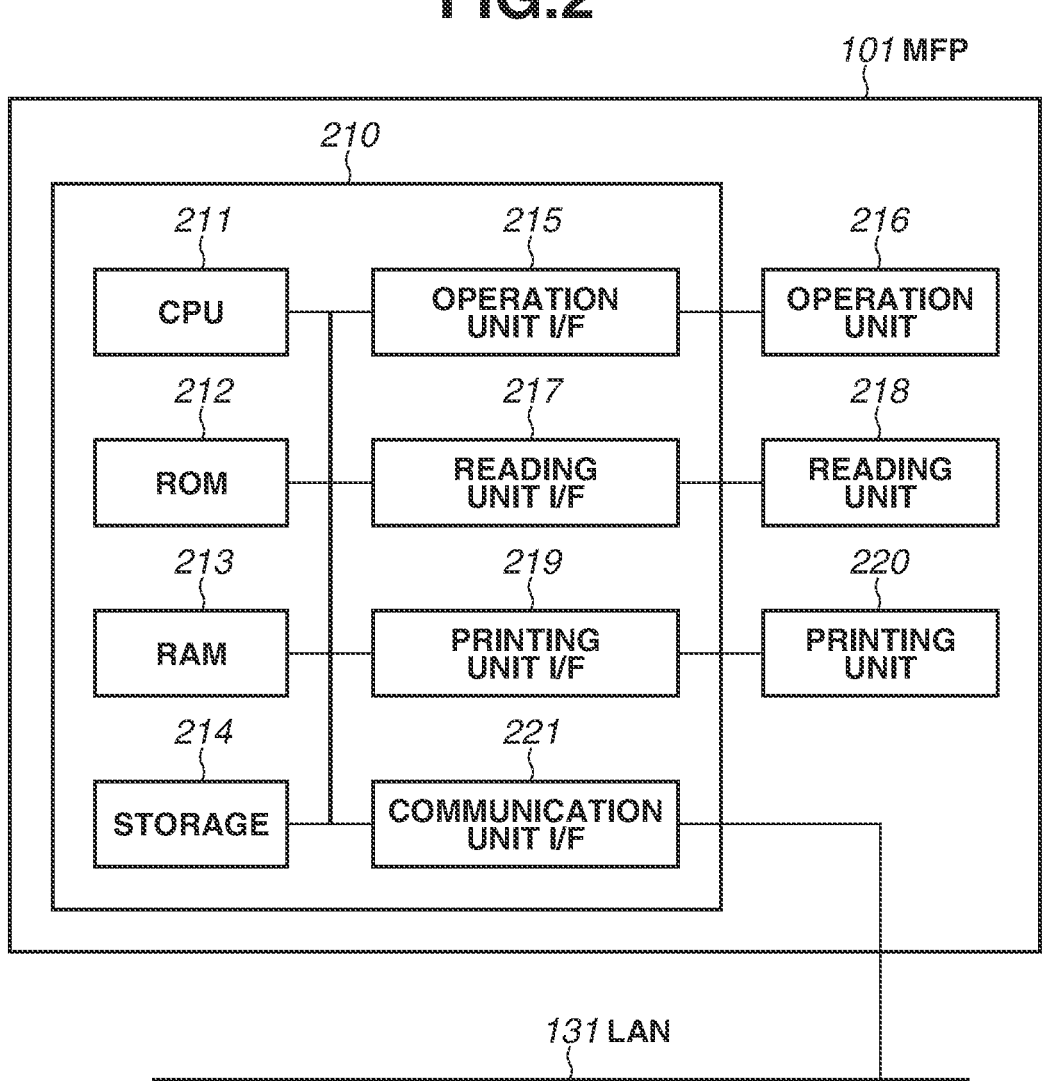
FIG. 2 illustrates an example of a hardware configuration of a Multi Function Peripheral (MFP).

Exemplary embodiments for embodying the present disclosure will be described below with reference to the accompanying drawings. The following exemplary embodiments do not limit every embodiment within the ambit of the appended claims. Not all of the combinations of the features described in the present exemplary embodiment are indispensable to every embodiment.

Figure 1:
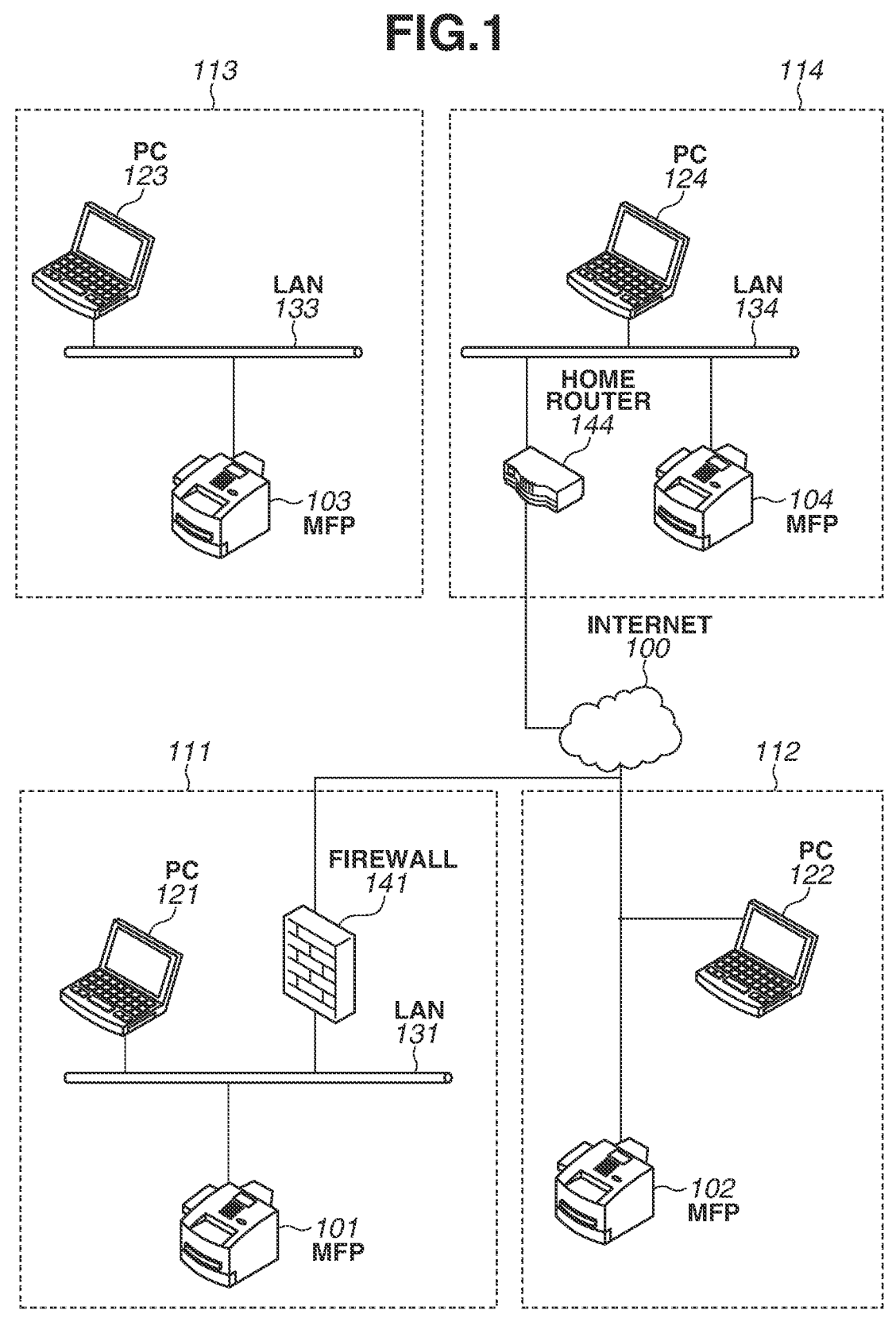

FIG. 1 illustrates an example of an information processing system according to a first exemplary embodiment. Multi Function Peripherals (MFPs) 101 to 104 as examples of the information processing apparatus according to the present exemplary embodiment are installed in different installation environments 111 to 114, respectively. The installation environments 111 to 114 illustrated in FIG. 1 include an in-house intranet environment 111, an Internet direct connection environment 112, an Internet inhibition environment 113, and a teleworking environment 114, respectively.

The in-house intranet environment 111 is an environment where the MFP 101 and a personal computer (PC) 121 are connected via a Local Area Network (LAN) 131. A firewall 141 is installed at the boundary between the LAN 131 and the Internet 100. More specifically, the communication between each of the information processing apparatuses in the in-house intranet environment 111 and the Internet 100 is monitored and protected by the firewall 141. Therefore, in the in-house intranet environment 111, the firewall 141 largely reduces the threat of access to each of the information processing apparatus by attackers from the Internet 100.

On the other hand, no firewall is installed in the Internet direct connection environment 112. In the Internet direct connection environment 112, the MFP 102 and a PC 122 are directly connected to the Internet 100 to perform communication. Therefore, the information processing apparatuses, such the MFP 102 and the PC 122, can benefit from measures against the threat of access by attackers from the Internet 100, for example, by using a personal firewall function in each of the information processing apparatuses.

The Internet inhibition environment 113 is a closed network environment isolated from other networks, such as the Internet 100. Information processing apparatuses, such as the MFP 103 and a PC 123, are connected through a LAN 133. In the Internet inhibition environment 113, network communication is possible only between the information processing apparatuses installed on the LAN 133. None of the information processing apparatuses is accessed by unspecified users on the Internet 100.

The teleworking environment 114 is an environment where the MFP 104 and a PC 124 are connected through a LAN 134 at home. Although the LAN 134 is a private network configured by a home router 144, the LAN 134 is not provided with security measures through a robust firewall as in the in-house intranet environment 111. Therefore, like the Internet direct connection environment 112, information processing apparatuses installed in the teleworking environment 114 may benefit from measures against the threat of access by attackers from the Internet 100, for example, by using a personal firewall function in each of the information processing apparatus.

The present exemplary embodiment classifies the use environment of an information processing apparatus, such as an MFP, into four different categories including the installation environments 111 to 114 illustrated in FIG. 1, and provides a collective setting function for collectively making security settings suitable for the categories. The collective setting function enables collectively performing a security policy or setting suitable for the use environment to make it easier for the user to perform security setting. More specifically, the function presents category options to the user and accepts selected options from the user.

When the user is prompted to use the function, the user may find it difficult to select a suitable category, or the category selected by the user may not be suitable for the actual environment. In this case, the information processing apparatus may possibly be operated with default settings (without the security setting), or operated with security settings for a category not suitable for the environment actually using the information processing apparatus. More specifically, there arises a problem that the information processing apparatus may possibly be operated in a state where security is not ensured.

In view of at least one of the above-described problems, the present exemplary embodiment estimates a category corresponding to the use environment of the information processing apparatus based on network information, and the present exemplary embodiment provides a mechanism for utilizing the result of the estimation. The above-described definition of categories does not limit every embodiment, and some of the categories according to the present exemplary embodiment or other categories may be defined in some embodiments.

Specific descriptions will be provided below. The categories corresponding to the four different installation environments illustrated in FIG. 1 and security measures to be taken for each of the installation environments will be described below with reference to Table 1.

TABLE 1

| Category corresponding to installation environment | | | |
| --- | --- | --- | --- |
| In-house intranet type | Internet inhibition type | Internet direct connection type | Teleworking type |
| Encrypt communication path ON | | ON | ON |
| Disable legacy protocols ON | | ON | ON |
| Enable personal firewall | | ON | ON |

4

TABLE 1-continued

| Category corresponding to installation environment | | | |
| --- | --- | --- | --- |
| In-house intranet type | Internet inhibition type | Internet direct connection type | Teleworking type |
| Enhance authentication safety ON | | ON | ON |
| Measures against physical attacks | | | ON |
| Disable file sharing function | | ON | |
| Disable external storage device ON | ON | ON | ON |

The MFPs 101 to 104 as examples of information processing apparatuses have various setting items, including setting items related to a security function and other setting items. Various kinds of control of the MFP 101 are performed according to the setting values corresponding to the setting items. Target items for collective settings for the security function according to the present exemplary embodiment include the seven different items illustrated in Table 1.

The encryption of a communication path is a security measure to prevent information leakage by encrypting the communication contents on the network. Examples of functions for implementing the encryption of the communication path include Transport Layer Security (TLS). In an environment connected to the Internet, it is desirable to encrypt the communication path since the communication contents may possibly be tapped by a third party. More specifically, the encryption of the communication path is recommended except for the Internet inhibition environment 113.

Disabling legacy protocols (i.e., disabling functions based on unsafe legacy communication protocols) is a security measure to prevent spoofing and information leakage. Examples of legacy protocols include Windows Internet Name Service (WINS). In an environment connected to an external network, such as the Internet, it is desirable to disable legacy protocols like legacy protocols for the encryption of the communication path. More specifically, except for the Internet inhibition environment 113, it is recommended to disable legacy protocols.

The personal firewall refers to a firewall to be installed on an MFP. Like the normal firewall, the personal firewall monitors communication between the MFP and an external network, such as the Internet. Examples of firewalls include an Internet Protocol (IP) filter and a port number filter. The IP filter is a security measure to read transmission destination and transmission source information for communication packets and permit only preset communication packets. This enables preventing an access by a third party to prevent information leakage. The port number filter is a security measure to prevent the invasion from ports, by closing unused ports. This enables preventing Denial of Service (DoS) as a cyber-attack that applies a large amount of load to cause the vulnerability. In an environment that is connected to an external network but has no firewall setting, it is desirable to enable the personal firewall because of the possibility of information leakage and DoS. More specifically, except for the Internet inhibition environment 113 connected to no external network and the in-house intranet environment 111 having a firewall setting, it is recommended to enable the personal firewall.

The enhancement of the authentication safety includes, for example, the inhibition of password caching, the specification of the minimum number of characters of a password, and the enhancement of spoofing measures. Except for the Internet inhibition environment 113 connected within an isolated network, it is desirable to enhance the authentication safety because of the possibility of spoofing.

Physical attack measures are security measures to prevent physical information leakage. In the MFPs 101 to 104, temporary data, such as a print job, is generated in a hard disk. Each MFP is provided with a job deletion function (i.e., a function of automatically overwriting (or deleting) the generated temporary data with other data) at the end of a job. Examples of physical attack measures for the MFPs 101 to 104 include the above-described job deletion function. If this function is set, the temporary data cannot be read even if a hard disk drive is physically removed.

In the teleworking environment 114 where neither strict admission management nor physical access limitation on MFPs is made, it is desirable to implement physical attack measures.

A file sharing function is a function of sharing files on a network in an environment. In an environment where unspecified users share a network in the environment, it is desirable to disable the file sharing function to prevent information leakage. More specifically, except for a private network environment where specified users share a network in the environment, it is recommended to disable the file sharing function. As described above, private network environments according to the present exemplary embodiment include the in-house intranet environment 111, the Internet inhibition environment 113, and the teleworking environment 114. In the Internet direct connection environment 112 directly connected to a public network, it is recommended to disable the file sharing function. Examples of settings for the file sharing function include Server Message Block (SMB) server settings.

Examples of disabling an external storage device include a setting of disabling a Universal Serial Base (USB) storage device as an external storage device in the MFP. This enables preventing information stored in the MFP from being written to external storage devices to prevent information leakage. This also enables preventing the infection by a computer virus via the USB storage device and information leakage accompanying it. The threat of information leakage by an external storage device, such as a USB storage device, is common to all of the installation environments. Therefore, it is desirable to disable the external storage device in all of the installation environments.

The above-described recommended setting values are summarized in Table 1. "ON" is described for items recommended to be set, and a diagonal line is drawn for items to be set to either "ON" or "OFF".

<Hardware Configuration of MFP 101>

The hardware configuration of the MFP 101 as an example of an information processing apparatus according to the present exemplary embodiment will be described below with reference to FIG. 2. FIG. 2 illustrates an example of a hardware configuration of the MFP 101. The MFPs 102 to 104 have a similar hardware configuration to the MFP 101.

The MFP 101 has a reading function as a function of reading an image on a sheet, and a file transmission function as a function of transmitting the read image to an external communication apparatus. The MFP 101 also has a print function as a function of printing an image on a sheet.

As described above, the present exemplary embodiment will be described below centering on the MFP 101 as an example of an information processing apparatus, and some embodiments are not limited thereto. For example, a Single Function Peripheral (SFP), such as a scanner or a printer, is also applicable. The present exemplary embodiment can also be applied to 3D printers, smart phones, digital cameras, network cameras, television sets, and other various types of communication and Internet of Things (IoT) devices connected to a network.

A control unit 210 including a Central Processing Unit (CPU) 211 controls the overall operation of the MFP 101. The CPU 211 reads a control program stored in a Read Only Memory (ROM) 212 or a storage 214 and performs various kinds of control, such as print control and read control. The ROM 212 stores a control program executable by the CPU 211. A Random Access Memory (RAM) 213 is the main memory of the CPU 211, and is used as a work area or a temporary storage area for loading various control programs. The storage 214 stores print data, image data, various programs, and various kinds of setting information. Although the present exemplary embodiment assumes an auxiliary storage device, such as a Solid State Drive (SSD), as the storage 214, a nonvolatile memory such as a Hard Disk Drive (HDD) may be used in lieu of the SSD. In this way, the hardware components including the CPU 211, the ROM 212, the RAM 213, and the storage 214 configure what is called a computer.

Although, in the MFP 101 according to the present exemplary embodiment, one CPU 211 executes each piece of processing illustrated in the flowcharts (described below) by using one memory (RAM 213), other forms are also applicable. For example, a plurality of CPUs, RAMs, ROMs, and storage devices can collaborate to execute each piece of processing illustrated in the flowcharts (described below). In addition, part of the processing may be executed by using a hardware circuit.

An operation unit interface (I/F) 215 connects an operation unit 216 and the control unit 210.

The operation unit 216 is provided with a liquid crystal display (LCD) unit having a touch panel function and various hardware keys. The operation unit 216 functions as a display unit for displaying information, and the operation unit 216 functions as a reception unit for receiving user instructions.

A reading unit I/F 217 connects a reading unit 218 and the control unit 210. The reading unit 218 (e.g., a scanner) reads a document placed on a document positioning plate or an Automatic Document Feeder (ADF) to generate a read image. The generated read image is to be stored in the storage 214 or the RAM 213. The read image generated by the reading unit 218 is transmitted to an external apparatus via a network, or is used for image printing on a sheet.

A printing unit I/F 219 connects a printing unit 220 and the control unit 210. The read image generated by the reading unit 218 and then stored in the storage 214 or the RAM 213 is transferred from the control unit 210 to the printing unit 220 via the printing unit I/F 219. The printing unit 220 receives the read image via the control unit 210 and then prints the read image on a sheet. The printing unit 220 can also perform printing based on a print job received from an external apparatus. Applicable printing methods for the printing unit 220 include an electrophotographic method, an inkjet method, a thermal transfer method, and other printing methods.

A communication unit I/F 221 is a communication interface included in the MFP 101. The control unit 210 is connected to the LAN 131 via the communication unit I/F 221. The communication unit I/F 221 can transmit data to a device or a server on the LAN 131, and to a server on the Internet via a gateway (not illustrated).

Although the present exemplary embodiment assumes a case where the communication unit I/F 221 is a communication interface for performing wire-lined communication conforming to Ethernet®, some embodiments are not limited thereto.

For example, the communication unit I/F 221 may be a wireless communication interface conforming to the Institute of Electrical and Electronics Engineers (IEEE) 802.11 series. Although the communication unit I/F 221 of the MFP 101 is connected to the LAN 131, the connected network depends on the installation environment. For example, the MFP 102 is directly connected to the Internet 100. The MFPs 103 and 104 are connected to the LANs 133 and 134, respectively.

<Software Configuration of MFP 101>

Figure 3:
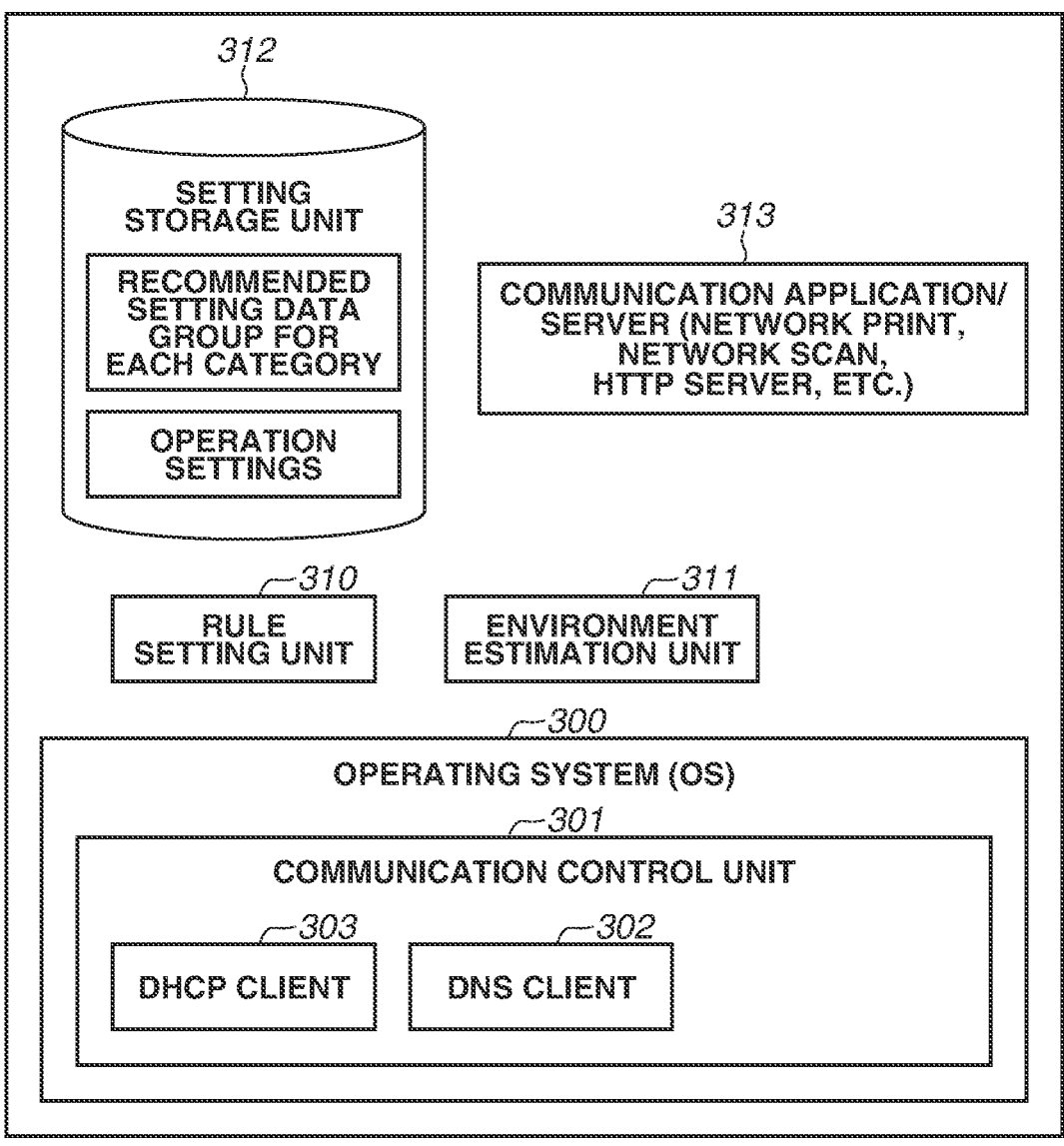
FIG. 3 illustrates an example of a software configuration of the MFP.

FIG. 3 illustrates an example of a software configuration of the MFP 101. The software in the MFP 101 includes three different layers: an Operating System (OS) 300, units that function as middleware (a rule setting unit 310, an environment estimation unit 311, and a setting storage unit 312), and a communication application/server 313.

The OS 300 is basic software for controlling the overall operation of the MFP 101. The OS 300 includes a communication control unit 301 that controls packet transmission and reception via the communication unit I/F 221. The communication control unit 301 includes a Domain Name System (DNS) client 302 and a Dynamic Host Configuration Protocol (DHCP) client 303.

The present exemplary embodiment assumes a case where the DNS client 302 is a DNS client provided by the OS 300, such as the Linux® system, as standard. When performing the name resolution of the domain name by using these clients, a description such as "nameserver "IP address of DNS server"" to files existing at a location "/etc/resolve-.conf" is made to specify a DNS server. For the sake of redundancy, a plurality of DNS servers to be used can be specified. The DNS client 302 is provided with a function of requesting the specified DNS server for the name resolution on the host name and the domain name. Upon reception of the name resolution result as a response to the request, the DNS client 302 acquires the IP address corresponding to the host name and the domain name.

The DHCP client 303 automatically acquires network information, such as the IP address, the default gateway, and the subnet, from a DHCP server existing on the network. The DHCP client 303 can attempt to acquire proxy server information from the DHCP server by using a Web Proxy Auto-Discovery (WPAD) technique.

The DNS client 302 can transmit an inquiry (query) about the WPAD. The DNS server that received the inquiry about the WPAD transmits proxy server information as a response to the DNS client 302. According to the present exemplary embodiment, when the proxy server information cannot be acquired in the acquisition of network information using the DHCP client 303, the DNS client 302 makes an inquiry about the WPAD.

The communication application/server 313 communicates with an external apparatus. In this case, the communication application/server 313 issues a data transmission request to the communication control unit 301 of the OS 300. Upon reception of the data transmission request, the communication control unit 301 transmits data to the external apparatus. When the destination address of the external apparatus is specified with the host name, the communication control unit 301 collaborates with the DNS client 302 to perform the above-described name resolution to acquire the IP address of the external apparatus. Subsequently, the communication control unit 301 collaborates with the communication unit I/F 221 to transmit a packet having the IP address as the destination address.

The communication control unit 301 also performs control to transfer the packet received by the communication unit I/F 221 to an internal communication application and server.

The communication application/server 313 is a module in the application layer through which the MFP 101 exchanges data with an external apparatus. As an example, the MFP 101 includes a network print application, a network scan application, and a HyperText Transfer Protocol (HTTP) server.

The network print application is an application that receives print data. The network print application collaborates with the printing unit 220 to print an image on a sheet based on a print job received from a print client of the external apparatus. The network scan application is an application that reads a document via the reading unit 218 and transmits a file based on the acquired read image to the scan client of the external apparatus. The HTTP server is a web server that provides the web browser with the setting screens and information confirmation screens of the MFP 101. The MFP 101 includes other various communication applications and servers which are omitted from the drawings to save space.

The middleware of the MFP 101 will be described below. The setting storage unit 312 stores settings made via the middleware and setting values and data to be used by the middleware and the OS. According to the present exemplary embodiment, the storage unit 312 stores a recommended setting data group as a combination of the category corresponding to the installation environment and the setting item and setting values of security measures recommended for each category illustrated in Table 1. More specifically, the storage unit 312 stores categories and the recommended setting data group corresponding to the categories in an associated way. The storage unit 312 also stores various setting items and the current setting values corresponding to the setting items in combination, as operation settings of the MFP 101. According to the present exemplary embodiment, as an example, the Boolean value ("True/False") is stored for each setting item. More specifically, "True" is stored for setting values indicated by ON in Table 1, and "False" is stored for setting values indicated by a diagonal line in Table 1. "False" indicates that the relevant setting item has no specific recommended setting value. The above-described data storage method is to be considered as illustrative but is not limited thereto.

The rule setting unit 310 provides the above-described collective setting function. The collective setting function presents category options to the user to make it easier for the user to perform the security setting. Then, the collective setting function enables collectively performing a suitable security policy or setting corresponding to the use environment by accepting selected options from the user. The environment estimation unit 311 estimates the use environment of the MFP 101 based on network information acquired via a network and network information obtained by acquiring the operation settings from the setting storage unit 312.

The collective setting function according to the present exemplary embodiment also includes an automatic setting function based on the estimation and a notification function as a function of notifying the user of the estimation result. The automatic setting function will be described below. When performing the automatic setting, the rule setting unit 310 requests the environment estimation unit 311 to estimate the network environment. The environment estimation unit 311 estimates the use environment of the MFP 101 and transmits the estimation result as a response. Upon reception of one category as an estimation result, the rule setting unit 310 performs the collective setting for changing the operation settings stored in the setting storage unit 312, based on the recommended setting data group corresponding to the category. More specifically, the rule setting unit 310 performs setting processing for changing, to ON, the operation settings values of the MFP 101 corresponding to the setting items with which "True" is stored for setting values of the recommended setting data group. On the other hand, the setting unit 310 leaves the operation settings unchanged from the current operation setting values corresponding to the setting items with which "False" is stored for setting values of the recommended setting data group. This processing enables collectively changing the recommended operation settings in the estimated use environment of the MFP 101.

Subsequently, the estimation result notification function will be described below. FIGS. 4A to 4C illustrate examples of setting screens displayed on the operation unit 216 of the MFP 101 by the setting unit 310. FIG. 4A illustrates an example of a setting screen displayed when the use environment is not set. FIG. 4B illustrates an example of a setting screen including an estimation result notification. FIG. 4C illustrates a modification displayed instead of the setting screen in FIG. 4B.

A list 401 includes a plurality of options corresponding to the categories. The user can select one of the options displayed in the list 401. The present exemplary embodiment will be described below centering on an example case where a character string plainly representing the use environment of the MFP 101 corresponding to the category is displayed as an option.

An Apply button 402 is used to apply the recommended setting values corresponding to the selected category to the operation settings of the MFP 101. A Cancel button 404 is used to cancel the settings made via the setting screen in FIG. 4A, without applying the settings to the operation settings of the MFP 101.

Information 405 is a message for notifying the user that the environmental type is not set and for prompting the user to select the environmental type or perform a diagnosis. An icon 406 is a button used to display the manual describing the environmental type in detail. When the CPU 211 detects that the icon 406 is selected by the user, the setting unit 310 displays the manual on recommended security settings.

A button 403 is used to perform the environmental diagnosis. When the CPU 211 detects that the button 403 is pressed, the setting unit 310 requests the environment estimation unit 311 to estimate the network environment and receives the estimation result. Upon reception of the estimation result, the setting unit 310 displays the selection screen illustrated in FIG. 4B based on the estimation result. Information 412 is information for notifying of the estimation result. Information 415, an example of information displayed instead of the information 405, includes information that the diagnosis is completed and information for prompting the user to select the environmental type.

FIG. 4B illustrates an example of a screen displayed when the estimation result is that the category corresponding to the use environment of the MFP 101 is the in-house intranet type.

A modification can be made to display the setting screen illustrated in FIG. 4C instead of the setting screen in FIG. 4B. This modification will be specifically described below. The setting unit 310 may be configured to display a setting screen in a state where such an option 421 as "In-house intranet type" as the category corresponding to the estimation result is selected, as illustrated in FIG. 4C. In this case, when the diagnosis is performed, the setting unit 310 can display a setting screen in a state where the environmental type corresponding to the category of the estimation result is automatically selected. Therefore, the user can collectively change the operation settings suitable for the estimated environmental type simply by selecting the Apply button 402. Information 425, an example of information displayed instead of the information 415, notifies the user of the current selection status. According to the present exemplary embodiment, display objects such as lists and buttons and display objects such as labels for displaying information are also referred to as display items.

<Use Environment Estimation Processing>

A specific technique for estimating the use environment will be described below with reference to FIGS. 5 and 6 and Tables 2 and 3.

Figure 5:
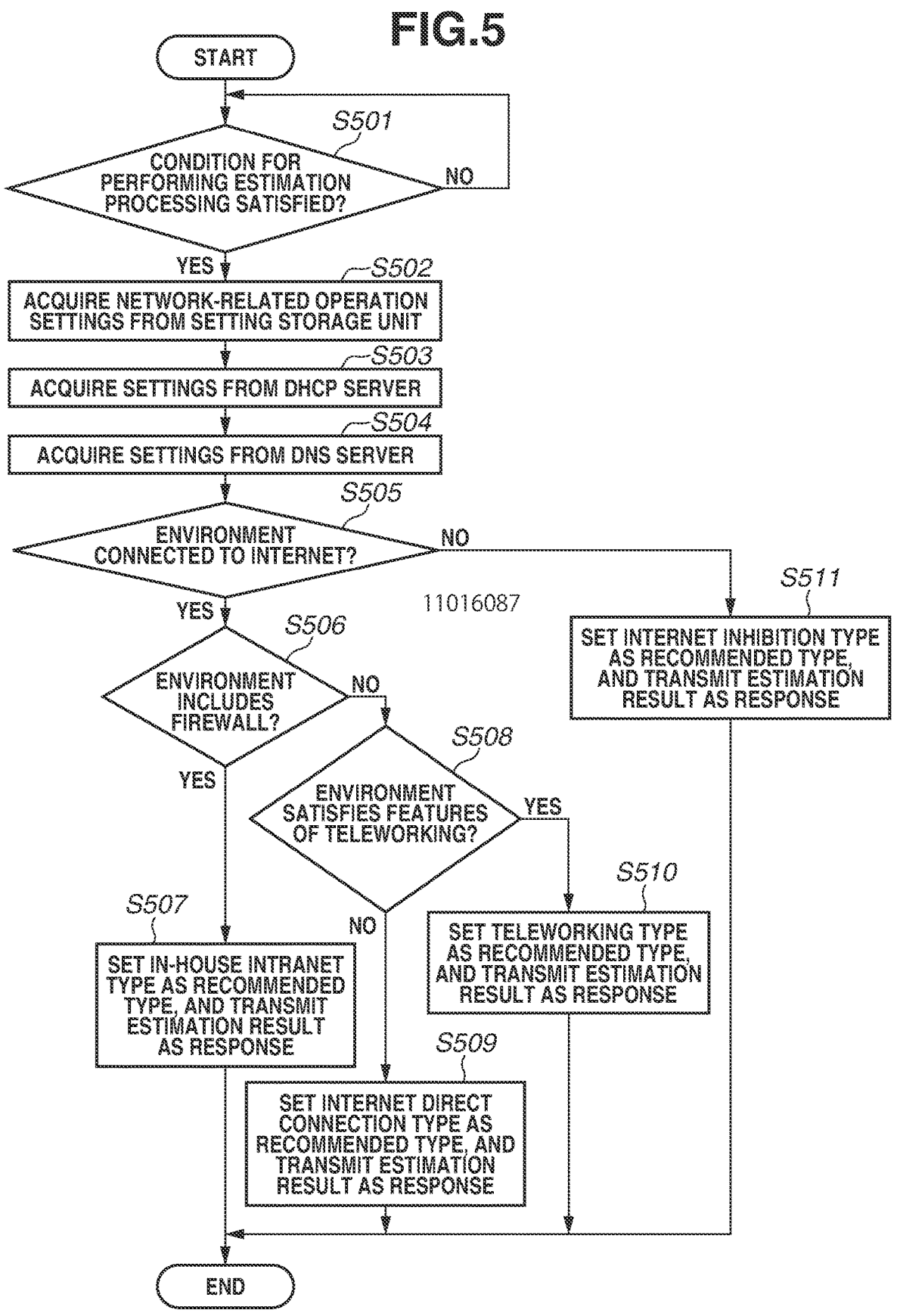
FIG. 5 is a flowchart illustrating an example of control in the MFP.
Figure 6:
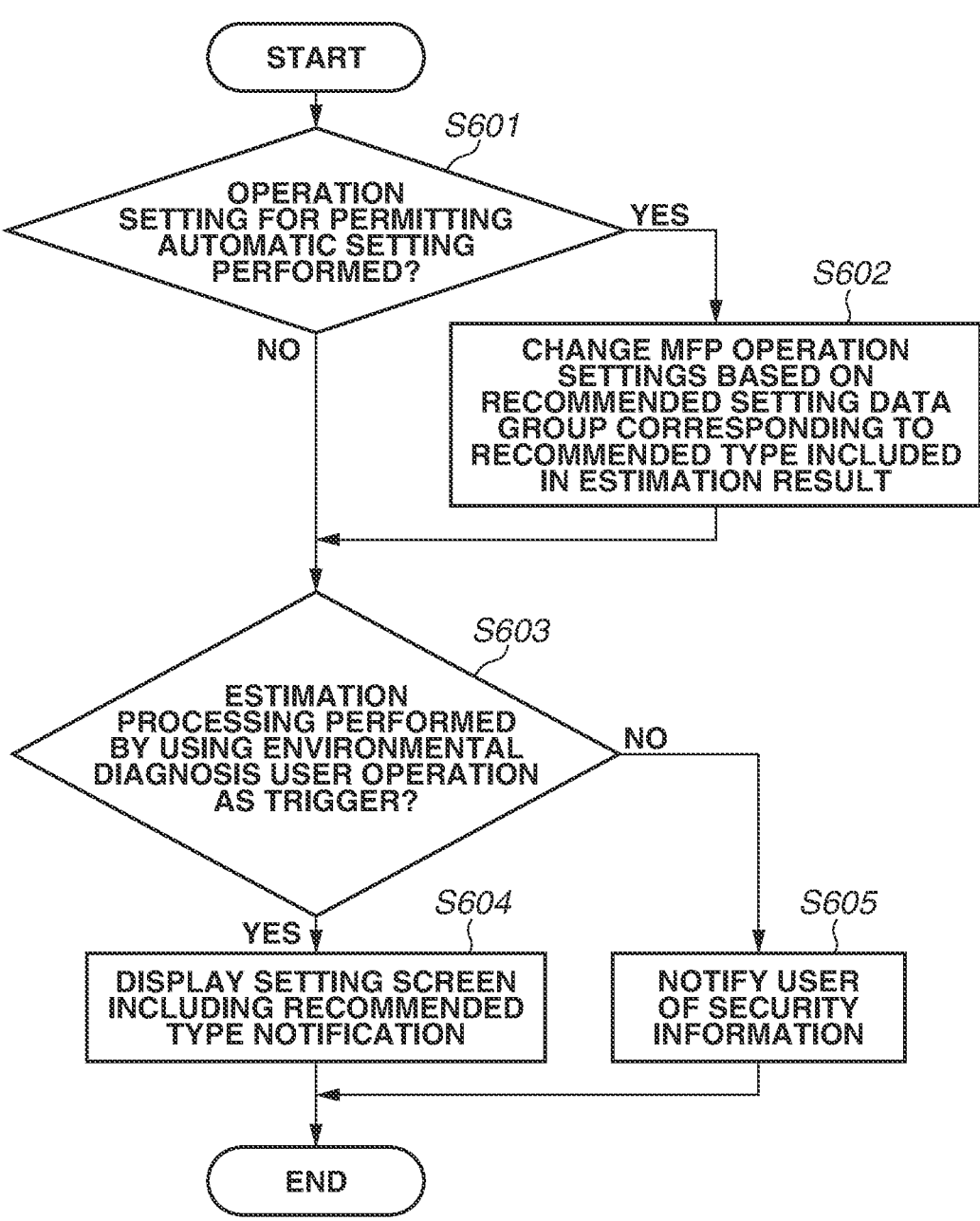
FIG. 6 is a flowchart illustrating another example of control in the MFP.

FIG. 5 is a flowchart illustrating an example of processing for estimating the use environment according to the present exemplary embodiment. Each piece of processing illustrated in the flowchart in FIGS. 5 and 6 is implemented when the CPU 211 loads a program for implementing each control module stored in the ROM 212 or the storage 214 into the RAM 213 and then executes the program. Data transmission and reception processing is implemented in collaboration with each communication unit I/F. In a case where the processing entity is to be cleared, descriptions will be made on the premise that the subject is the software module executed by the CPU 211.

The flowchart illustrated in FIG. 5 is an example of processing executed when power of the MFP 101 is turned ON from OFF and then the activation processing is completed. Referring to FIG. 5, processing related to the estimation and collective setting is selectively described to save space.

In step S501, the rule setting unit 310 determines whether a condition for performing the estimation is satisfied. More specifically, when the CPU 211 detects that a user operation for selecting the button 403 illustrated in FIG. 4A is performed, the rule setting unit 310 determines that the condition for performing the estimation is satisfied. The setting storage unit 312 stores the operation settings indicating whether to perform the automatic estimation. The operation setting about whether to perform the automatic estimation is set through an operation by a user having the administrator's authority via a management screen (not illustrated). When the automatic estimation is set to be performed, the setting unit 310 determines that the condition for performing the estimation processing is satisfied at the activation timing of the MFP 101 and when a predetermined time (e.g., 8:00 a.m.) comes. Although the present exemplary embodiment uses a condition that a predetermined time comes as an example, some embodiments are not limited thereto. The setting unit 310 can determine that the condition for performing the estimation processing is satisfied when a pre-determined time period (e.g., 24 or 48 hours) has elapsed since the last estimation. When the setting unit 310 determines that the condition for performing the estimation is satisfied, the setting unit 310 requests the environment estimation unit 311 to estimate the network environment.

In step S502, upon reception of the request, the environment estimation unit 311 acquires the network-related operation settings from the setting storage unit 312. Hereinafter, the operation settings acquired in step S502 are also simply referred to as network settings. In step S503, the environment estimation unit 311 acquires various kinds of information from an external DHCP server via the DHCP client 303.

In step S504, the environment estimation unit 311 acquires various kinds of information from an external DNS server via the DNS client 302. The network information acquired in the processing in steps S502 to S504 will be described below with reference to Table 2.

TABLE 2

| | Acquired information | Data acquisition source | | |
| | | Operation setting | DHCP server | DNS server |
|---|---|---|---|---|
| 1 | IP address of self-apparatus | YES | YES | NO |
| 2 | Gateway address | YES | YES | NO |
| 3 | DHCP server address | YES | YES | NO |
| 4 | WINS server address | YES | YES | NO |
| 5 | SMTP server address | YES | YES | NO |
| 6 | POP server address | YES | YES | NO |
| 7 | SIP server address | YES | YES | NO |
| 8 | Setting of Internet-based services | YES | NO | NO |
| 9 | Proxy server address | YES | YES | YES |

Information 1 to 7 includes network-related settings acquired by referring to the current operation settings of the MFP 101 and acquired from the DHCP server on the network. Information 8 is a setting acquired by referring to the current operation settings of the MFP 101. More specifically, the acquired setting values include a setting value that indicates whether the operation setting for using a remote management service (in which apparatus information for the MFP 101 is managed by a cloud server) is made, and a setting value that indicates whether the operation setting for using a cloud print service is made. Information 9 is a network-related setting acquired by referring to the operation settings and acquired from the DHCP and the DNS servers on the network by using the above-described WPAD technique.

The environment estimation unit 311 acquires the network information 1-9 illustrated in Table 2. The environment estimation unit 311 performs the estimations in steps S505, S506, and S508 based on the acquired information. An estimation algorithm will be described below with reference to Table 3.

TABLE 3

| | Condition | Environment connected to Internet? | Environment with firewall? | Environment satisfying features of teleworking? |
|---|---|---|---|---|
| 1 | DNS server, gateway, and DHCP server addresses are common | NO | NO | YES |

TABLE 3-continued

| | Condition | Environment connected to Internet? | Environment with firewall? | Environment satisfying features of teleworking? |
|---|---|---|---|---|
| 2 | IP address of self-apparatus is global IP address | YES | NO | NO |
| 3 | Various server addresses (3-7 in Table 2) include global IP address | YES | NO | NO |
| 4 | Default gateway can be acquired | YES | NO | NO |
| 5 | Internet-based services are set to be usable | YES | NO | NO |
| 6 | Proxy server address can be acquired | NO | YES | NO |

According to the present exemplary embodiment, the environment estimation unit 311 performs three different determinations having different characteristics to estimate the category corresponding to the use environment of the MFP 101. The first determination is a determination whether the environment is connected to the Internet. The second determination is a determination whether a firewall exists in the environment. The third determination is a determination whether the environment satisfies the features of teleworking.

In step S505, the environment estimation unit 311 performs the first determination to determine whether the environment is connected to the Internet. When the environment estimation unit 311 determines that any one of the conditions 2 to 5 is satisfied, by using the acquired network information, the environment estimation unit 311 determines that the environment is connected to the Internet. On the other hand, when none of the conditions 2 to 5 is satisfied, the environment estimation unit 311 determines that the environment is not connected to the Internet. When the environment estimation unit 311 determines that the environment is connected to the Internet (YES in step S505), the processing proceeds to step S506. On the other hand, when the environment estimation unit 311 determines that the environment is not connected to the Internet (NO in step S505), the processing proceeds to step S511.

In step S511, the environment estimation unit 311 transmits the estimation result with the Internet inhibition type set as the recommended type, as a response, and then ends the series of processing.

In step S506, the environment estimation unit 311 performs the second determination to determine whether a firewall exits in the environment. More specifically, the environment estimation unit 311 determines whether the condition 6 is satisfied by using the acquired network information. More specifically, when a proxy server address is acquired, the environment estimation unit 311 determines that a firewall exists in the environment. On the other hand, when a proxy server address cannot be acquired from any data acquisition source, the environment estimation unit 311 determines that no firewall exists in the environment. When the environment estimation unit 311 determines that no firewall exits in the environment (NO in step S506), the processing proceeds to step S508. On the other hand, when the environment estimation unit 311 determines that a firewall exists in the environment (YES in step S506), the processing proceeds to step S507.

In step S507, the environment estimation unit 311 transmits the estimation result with the in-house intranet type set as the recommended type, as a response, and then ends the series of processing.

In step S508, the environment estimation unit 311 performs the third determination to determine whether the environment satisfies the features of the teleworking environment. More specifically, the environment estimation unit 311 determines whether the condition 1 is satisfied by using the acquired network information. More specifically, when the DNS server address, the default gateway address, and the DHCP server address are common, the environment estimation unit 311 determines that the environment satisfies the features of the teleworking type. When the environment estimation unit 311 determines that the environment satisfies the features of the teleworking type (YES in step S508), the processing proceeds to step S510. On the other hand, when the environment estimation unit 311 determines that the environment does not satisfy the features of the teleworking type (NO in step S508), the processing proceeds to step S509.

In a case where the DNS server, the default gateway, and the DHCP server are implemented with a single communication apparatus, the communication apparatus is highly likely to be connected to a network where the home router 144 is installed. Therefore, in the processing in step S508, when the DNS server address, the gateway address, and the DHCP server address are common, the environment estimation unit 311 determines that the environment is highly likely to be the teleworking environment. The determination is not limited thereto. For example, even in the teleworking environment, some users specify a public DNS server, such as "1.1.1.1" or "8.8.8.8", as a DNS server to increase the speed of the name resolution. Taking this point into consideration, the environment estimation unit 311 can also be configured to determine that the environment satisfies the features of the teleworking type when both a condition that the gateway address and the DHCP server address are common and a condition that the DNS server address is a public DNS server are satisfied.

In step S509, the environment estimation unit 311 transmits the estimation result with the Internet direct connection type set as the recommended type, as a response, and then ends the series of processing. In step S510, the environment estimation unit 311 transmits the estimation result with the teleworking type set as the recommended type, as a response, and then ends the series of processing.

As described above, the environment estimation unit 311 can estimate the category corresponding to the use environment of the MFP 101, based on the network information acquired from an external apparatus on the network and from the operation setting information of the self-apparatus.

The utilization of the estimation result obtained by the environment estimation unit 311 will be described below with reference to FIG. 6. Each piece of processing illustrated in the flowchart in FIG. 6 is performed when the rule setting unit 310 receives the estimation result as a response from the environment estimation unit 311. Referring to FIG. 6, processing related to the collective setting function is selectively described to save space.

In step S601, the setting unit 310 refers to the operation settings stored in the setting storage unit 312 to determine whether the operation setting for permitting the automatic setting is made. When the operation setting for permitting the automatic setting is made (YES in step S601), the processing proceeds to step S602. On the other hand, when the operation setting for permitting the automatic setting is not made (NO in step S601), the processing proceeds to step S603. The operation setting about whether to permit the automatic setting can be changed based on an operation of a user having the administrator authority via a setting screen (not illustrated). The operation setting about whether to permit the automatic setting performed via a setting screen (not illustrated) is stored in the setting storage unit 312.

In step S602, the setting unit 310 refers to the setting storage unit 312 to acquire the recommended setting data group corresponding to the recommended type included in the estimation result. For example, when the recommended type is the teleworking type, the setting unit 310 acquires the recommended setting data group associated with such a category as the teleworking type. Subsequently, the setting unit 310 changes the operation settings of the MFP 101 based on the acquired recommended setting data group. Then, the processing proceeds to step S603.

In step S603, the setting unit 310 determines whether the estimation processing is performed by using an environmental diagnosis user operation as a trigger. When the setting unit 310 determines that the estimation processing is performed by using an environmental diagnosis user operation as a trigger (YES in step S603), the processing proceeds to step S604. On the other hand, when the setting unit 310 does not determine that the estimation processing is performed by using an environmental diagnosis user operation as a trigger (NO in step S603) (i.e., when the estimation processing is periodically performed), the processing proceeds to step S605.

In step S604, the setting unit 310 displays a setting screen including a recommended type notification on the operation unit 216 and then ends the series of processing. FIGS. 4B and 4C illustrate examples of setting screens including the notification. When the operation setting for permitting the automatic setting is made, the setting unit 310 may display a setting screen including a notification indicating that the recommended type is automatically selected as the environmental type, and that the collective setting has been made.

Figure 7:
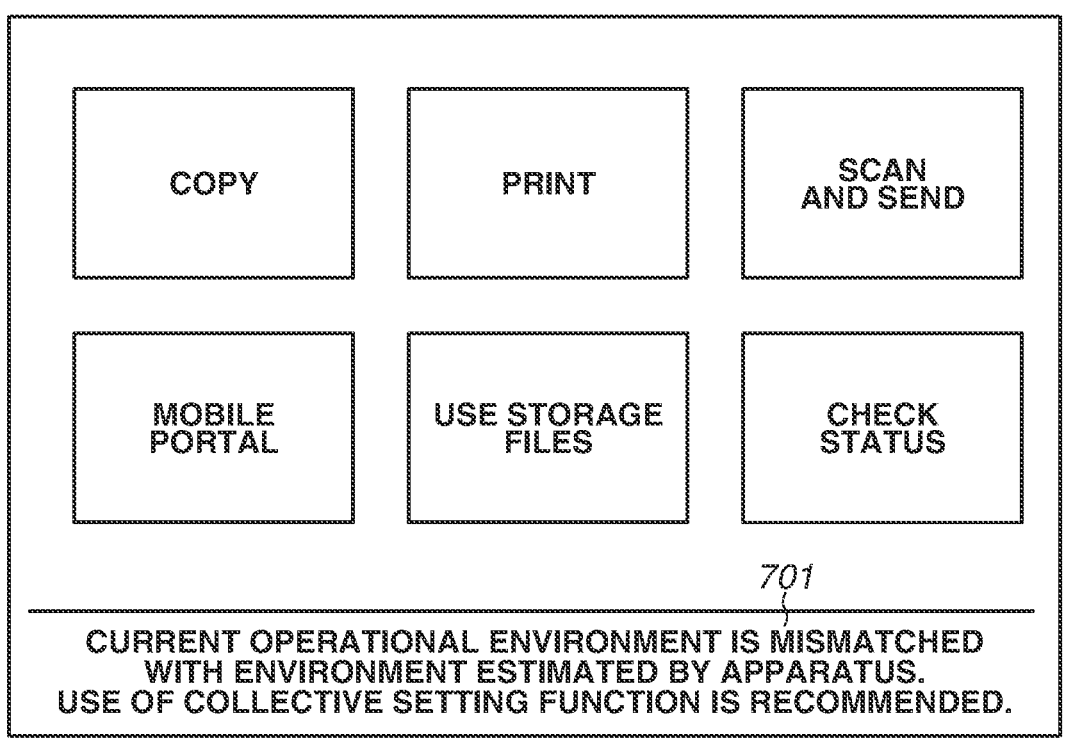
FIG. 7 illustrates an example of a screen displayed on the operation unit of the MFP.

In step S605, the setting unit 310 notifies the user of information about the collective setting function. The notification may be made with an audio guidance or information display on the operation unit 216. FIG. 7 illustrates an example of a notification issued in step S605 (i.e., an example of a notification to the user issued by displaying the information about the collective setting function in the status display area on the operation unit 216). An area 701 is the status display area. Referring to FIG. 7, the area 701 displays an example of a notification issued when the currently selected environmental type is different from the recommended type estimated by the apparatus. The area other than the area 701 is the main display area where a main menu screen, a copy screen, and a scan screen are displayed. The area other than the area 701 displays operation screens and setting screens according to a user operation.

Upon issuance of the notification, the user is notified of information about the recommendation of the use of the collective setting function. When the setting unit 310 performs the change processing in step S602, the setting unit 310 notifies the user of information indicating that the automatic change by the collective setting function has been performed, as the information about the collective setting function. The setting unit 310 may also be configured to further notify the user of information indicating the recommended type after the change. When the currently selected environmental type coincides with the recommended type estimated by the apparatus, the setting unit 310 omits the issuance of notifications to the user.

The above-described processing enables estimating the category corresponding to the use environment of the information processing apparatus, based on the network information, enabling the MFP 101 to utilize the estimation result. More specifically, displaying the estimation result on a setting screen enables assisting the category selection by the user. Displaying the estimation result also enables collectively setting and changing the security settings based on the estimation result.

The first exemplary embodiment has been described above centering on an example of classifying the use environment of the MFP 101 into four different categories (the installation environments 111 to 114 illustrated in FIG. 1), and providing the collective setting function for collectively making the security settings suitable for the categories. A second exemplary embodiment will be described below centering on a case of subdividing the environmental categories. In the estimation processing based on the network information, there may be a case where subdividing the environmental categories prevents the use environment of the MFP 101 from being uniquely estimated.

Taking this point into consideration, the second exemplary embodiment provides a mechanism for presenting a plurality of candidates of recommended environments when the installation environment cannot be uniquely estimated. The mechanism will be specifically described below.

Figure 8:
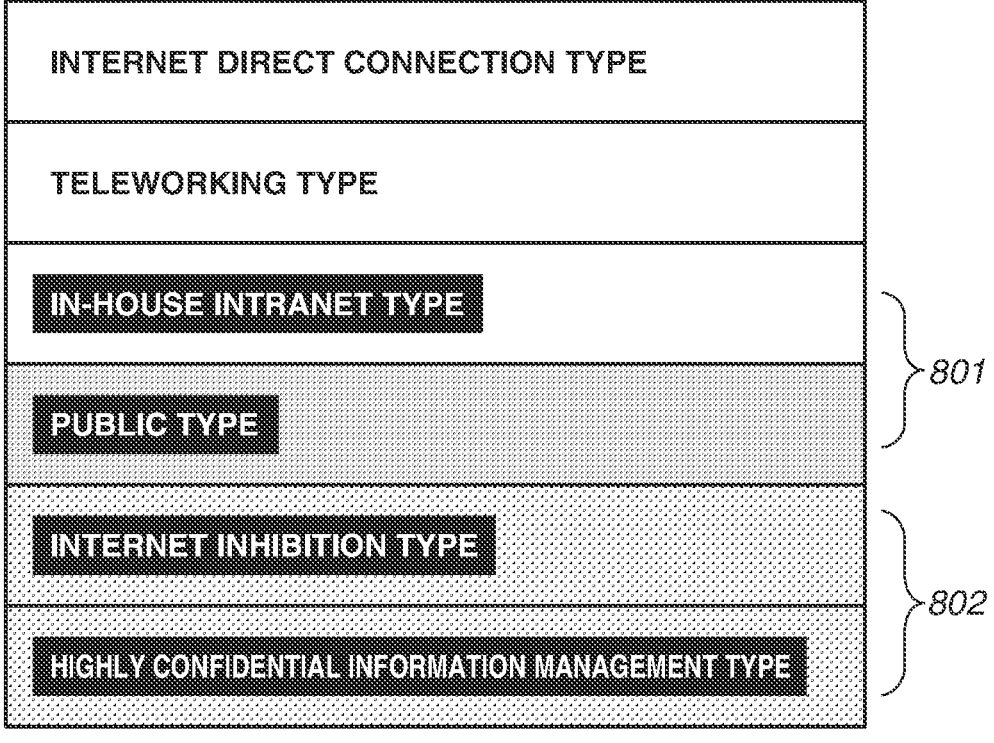
FIG. 8 schematically illustrates a plurality of categories according to a second exemplary embodiment.

FIG. 8 schematically illustrates categories according to the second exemplary embodiment. In addition to the four categories according to the first exemplary embodiment, the environments using the MFP are classified into six different categories including two additional types: a public space type and a highly confidential information management type.

The public space type is an environment connected to the Internet, having a feature of being used by unspecified users. There is a case where a firewall is installed in the public space. Specific descriptions of the recommended setting data group corresponding to this environmental type will be omitted to save space. The settings of the setting data group corresponding to this environmental type give more importance to security than the settings of the setting data group corresponding to the in-house intranet type, but less importance to security than the settings of the setting data group corresponding to the Internet direct connection type.

The highly confidential information management type handles highly confidential information, and therefore needs to give top priority to security measures. This type is on the premise of not being connected to the Internet to ensure security. Specific descriptions of the recommended setting data group corresponding to this environmental type will be omitted for want of space. The settings of the setting data group corresponding to this environmental type give more importance to security than the settings of the setting data group corresponding to each of any other environmental types.

When a firewall is installed in the public space, the in-house intranet type and the public type will satisfy the same condition, and therefore other information is required to distinguish between the two environmental types.

According to the second exemplary embodiment, the two categories are also referred to as a similar category 801 for the sake of description.

The highly confidential information management type and the Internet inhibition type satisfy the same condition of not being connected to the Internet. This makes it difficult to estimate which of the two types is to be recommended based on the network settings. According to the present exemplary embodiment, the two categories are also referred to as a similar category 802 for the sake of description.

Figure 9:
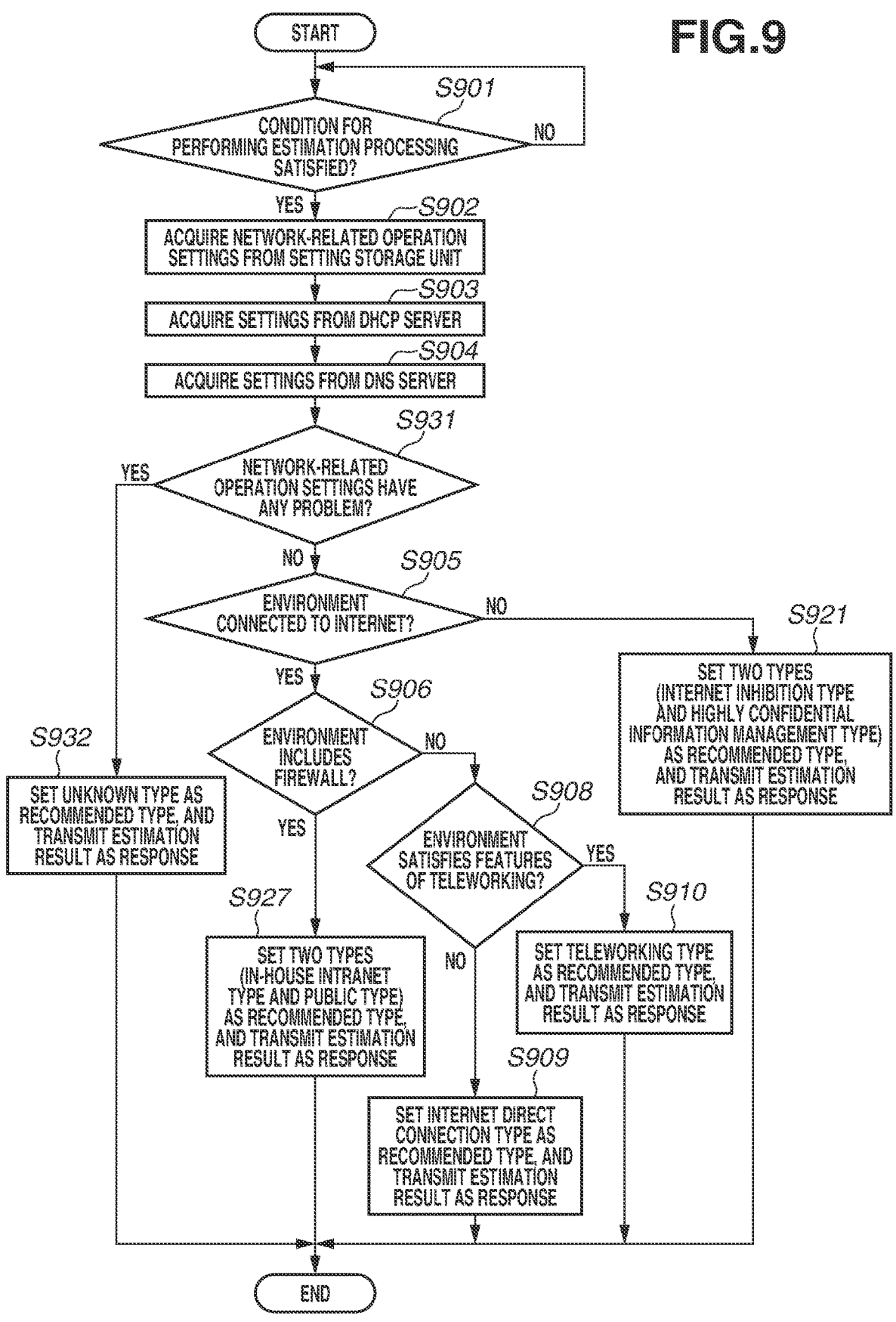
FIG. 9 is a flowchart illustrating an example of control in the MFP according to the second exemplary embodiment.

FIG. 9 illustrates an example of processing according to the second exemplary embodiment to be performed instead of the processing in FIG. 5 according to the first exemplary embodiment. The second exemplary embodiment differs from the first exemplary embodiment in that the two categories classified as the similar category 801 illustrated in step S927 are set as the recommended type, as a substitute for the processing in step S507.

The second exemplary embodiment also differs from the first exemplary embodiment in that the two categories classified as the similar category 802 illustrated in step S921 are set as the recommended type, as a substitute for the processing in step S511. The second exemplary embodiment also differs from the first exemplary embodiment in that the determination processing in step S931 and the exception processing in step S932 are added after the processing in step S904.

The processing in steps S901 to S904 is similar to the processing in steps S501 to S504, respectively, and redundant descriptions thereof will be omitted. When the processing in step S904 is completed, the processing proceeds to step S931. In step S931, the environment estimation unit 311 determines whether the network-related operation settings have any problem. The determination will be specifically described below. When the default gateway is not set but the proxy server address is set as the operation settings of the MFP 101 acquired in step S902, the environment estimation unit 311 determines that the operation settings have a problem. When the default gateway is not set but the operation setting for using Internet-based services is made, the environment estimation unit 311 also determines that the operation settings have a problem. In these states, the default gateway is not set although the operation setting on the premise of the Internet access is made, making it impossible to suitably perform communication. In this case, the environment estimation unit 311 needs to review the network-related operation settings before performing the estimation processing. More specifically, this processing is equivalent to the exception processing for canceling the estimation processing.

When the environment estimation unit 311 determines that the network-related operation settings have a problem (YES in step S931), the processing proceeds to step S932. On the other hand, when the environment estimation unit 311 does not determine that the network-related operation settings have a problem (NO in step S931), the processing proceeds to step S905.

In step S932, the environment estimation unit 311 transmits the estimation result with the unknown type set as the recommended type, as a response, and then ends the series of processing.

The processing in steps S905 to 906 is similar to the processing in steps S505 to S506, respectively, according to the first exemplary embodiment. When the environment estimation unit 311 determines that the environment is connected to the Internet and includes a firewall (YES in steps S905 and S906), the processing proceeds to step S927.

In step S927, the environment estimation unit 311 transmits the estimation result with two types (the in-house intranet type and the public type) set as the recommended type and then ends the series of processing. The processing in steps S908 to S910 is similar to the processing for estimating the Internet direct connection type or the teleworking type in steps S508 to S510, respectively, according to the first exemplary embodiment, and redundant descriptions thereof will be omitted.

When the environment estimation unit 311 determines that the environment is not connected to the Internet (NO in step S905), the processing proceeds to step S921. In step S921, the environment estimation unit 311 transmits the estimation result with two types (the Internet inhibition type and the highly confidential information management type) set as the recommended type and then ends the series of processing.

According to the second exemplary embodiment, as described above, if the category corresponding to the use environment of the MFP 101 cannot be uniquely narrowed down even after performing the estimation processing, the environment estimation unit 311 transmits the estimation result including a plurality of recommended types as a response.

Utilization processing based on the estimation result will be described below centering on the differences from the first exemplary embodiment. FIG. 6 illustrates a case where the operation settings are automatically changed by the processing in steps S601 to S602 according to the first exemplary embodiment. According to the second exemplary embodiment, the environment estimation unit 311 additionally determines whether the recommended type can be uniquely estimated after the processing in step S601. When two or more recommended types are included in the estimation result, the setting unit 310 determines that the recommended type cannot be uniquely estimated. Then, the processing proceeds to step S603 by skipping step S602. When only one recommended type is included in the estimation result, the setting unit 310 determines that the recommended type can be uniquely estimated. Then, the processing proceeds to step S602.

The contents of the setting screen in step S604 have a difference. The display of the setting screen will be described below with reference to FIGS. 10A and 10B. FIG. 10A illustrates an example of a setting screen displayed when the estimation result is obtained, and two or more recommended types are included in the estimation result according to the second exemplary embodiment. FIG. 10B illustrates a modification of the list display.

Information 1015 is displayed instead of the information 415 illustrated in FIG. 4B.

The information 1015 indicates that the environmental type cannot be uniquely identified. The setting unit 310 performs control to display the information 1015 in a setting screen when two or more recommended types are determined to be included in the estimation result.

When two or more recommended types are determined to be included in the estimation result, the setting unit 310 differentiates the display form of an environmental type list 1001. More specifically, when two or more recommended types are included in the estimation result, the setting unit 310 displays the character strings of the options corresponding to the recommended types in boldface, concatenated with a character string indicating that these types are recommended settings. This display control enables displaying options corresponding to the recommended types included in the estimation result in a more highlighted form than the options corresponding to the other categories not included in the recommended result. An option group 1010 in FIG. 10A is an example of options displayed in a highlighted form.

When two or more recommended types are determined to be included in the estimation result, the setting unit 310 performs control to display information 1012 instead of the information 412. The information 1012 includes information identifying the two or more environmental types included in the estimation result, and information indicating that the two or more environmental types included in the estimation result are highly likely to coincide with the use environment of the MFP 101. The information 1012 also includes a message for promoting the user to select the type that suits the actual environment. When the setting unit 310 detects that either one of the areas corresponding to the information 1013 and 1014 for identifying the environmental types is selected by the user, the setting unit 310 performs control to display a help page specifically describing the selected environmental type. This processing enables providing a detailed help to the user who cannot determine which of the options of environmental types is to be selected.

FIG. 10B illustrates a modification of the highlighted display. When displaying the list 1001, the highlighted display can also be made by supplying an icon image (for example, a star-shaped icon image or an icon image indicating a sum-up) indicating recommended settings.

When the recommended type included in the estimation result indicates an unknown type, the setting unit 310 performs control to display a message for notifying that the estimation cannot be performed and prompting the user to review the network settings, instead of the information 1012.

When the installation environment cannot be uniquely estimated, the above-described processing enables presenting a plurality of candidates of recommended environments. This enables suitably assisting the user operation to select the category corresponding to the use environment of the MFP 101.

<Modifications>

The first and second exemplary embodiments have been described above centering on an example case of displaying the setting screens illustrated in FIGS. 4A to 4C, 10A, and 10B on the operation unit 216. However, the method for providing the user with setting screens is not limited thereto. For example, the MFP 101 can be configured to function as an HTTP server to provide an external web browser that has accessed the HTTP server with a web page for changing settings and a web page including information for supporting a notification. In this case, the setting unit 310 collaborates with the HTTP server as the application/server 313 in FIG. 3 to generate a web page corresponding to the setting screens illustrated in FIGS. 4A to 4C, 10A, and 10B and provide the external web browser with the web page. Upon reception of the web page, the external web browser interprets the web page and displays a setting screen. Then, the web browser suitably accepts a setting change operation on the screen and then transmits an HTTP request including data for identifying the change operation to the MFP 101. The HTTP server of the MFP 101 identifies the contents of the setting change based on the data for identifying the change operation. Then, the HTTP server transfers the identified contents of the setting change to the setting unit 310. Upon reception of the contents of the setting change, the setting unit 310 performs the setting change processing. As described above, setting screens of the MFP 101 can be provided by using what is called a WebUI.

The first and second exemplary embodiments have been described above centering on an example case of providing a plurality of categories corresponding to the use environment of an information processing apparatus, such as the MFP 101, and prompting the user to select the categories. However, some embodiments are not limited thereto. For example, the MFP 101 can also be configured to classify a plurality of categories by level (e.g., security levels 1 to 4).

The first and second exemplary embodiments have been described above centering on an example case of turning ON the security-related operation settings when changing the operation settings group corresponding to the category by using the collective setting function. However, some embodiments are not limited thereto. For example, the MFP 101 can also be configured to collectively make finer setting changes, for example turning OFF some settings and automatically adding a filtering rule related to the firewall function. Specific descriptions will be made with reference to Table 4.

TABLE 4

| | Setting item | In-house intranet type | Internet inhibition type | Internet direct connection type | Teleworking type |
|---|---|---|---|---|---|
| Encrypt communication path | TLS setting | ON | | ON | ON |
| Disable legacy protocols | WINS setting | OFF | | OFF | OFF |
| Enable personal firewall | Default policy of reception IP address filter | Rejected | | Rejected | Rejected |
| | Exception address of reception IP address filter | Subnet address | | Subnet address | Subnet address |
| Enhance authentication safety | Inhibit cache storage of authentication password of external servers | Inhibited | | Inhibited | Inhibited |
| | Set minimum number of characters of password | 8 characters | | 8 characters | 8 characters |
| Measures against physical attacks | Job deletion setting | | | | ON |
| Disable file sharing function | SMB server setting | | | OFF | |
| Disable external storage device | Use USB external storage device | OFF | OFF | OFF | OFF |

For example, when enabling the personal firewall, the setting unit 310 changes the default policy of the reception IP address filter to "Rejected". Further, the setting unit 310 sets the filtering rule so that the address of the subnetwork indicating the network to which the MFP 101 belongs is an exception address for "Rejected". This processing enables making such an operation setting that accepts communication from devices belonging to the same network segment as the MFP 101 but does not accept communication from the Internet and other network segments. The Boolean values according to the first exemplary embodiment are stored for the recommended setting value group for each category corresponding to Table 4. When the Boolean value is "True", the applicable setting data may also be stored. When performing the collective setting, the setting unit 310 changes settings by using the setting data corresponding to the setting items with which the Boolean value "True" is stored. On the other hand, the setting unit 310 performs controls not to change settings from the current setting values for the setting items with which the Boolean value "False" is stored.

Other Exemplary Embodiments

Some embodiments can also be achieved when a program for implementing at least one of the functions according to the above-described exemplary embodiments is supplied to a system or an apparatus via a network or a storage medium, and at least one processor in a computer of the system or the apparatus reads and executes the program. Further, some embodiments can also be achieved by a circuit (for example, an application specific integrated circuit (ASIC) or a Field Programmable Gate Array (FPGA)) for implementing at least one function.

According to an aspect of the present disclosure, some embodiments enable estimating a category corresponding to the use environment of the information processing apparatus based on network information and utilizing the result of the estimation.

Other Embodiments

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2021-199140, which was filed on Dec. 8, 2021 and which is hereby incorporated by reference herein in its entirety.

What is claimed is:

1. An image processing apparatus comprising:
one or more memories; and
one or more processors in communication with the one or more memories, wherein the one or more processors and the one or more memories cooperate to cause the image processing apparatus to:
display, on a screen, a first object for receiving an instruction to estimate a use environment of the image processing apparatus from among a plurality of use environments and a second object including the plurality of use environments for receiving a selection of a use environment from among the plurality of use environments;
receive the instruction to estimate a use environment of the image processing apparatus from among the plurality of use environments by using the first object;
estimate a use environment of the image processing apparatus from among the plurality of use environments based on an address of an external device acquired by the image processing apparatus; and
display, on the screen, the use environment estimated from among the plurality of use environments in addition to the first object for receiving the instruction to estimate a use environment from among the plurality of use environments and the second object including the plurality of use environments for receiving the selection of a use environment from among the plurality of use environments;
receive the selection of a use environment from among the plurality of use environments by using the second object; and
set values corresponding to the selected use environment to the image processing apparatus.

2. The image processing apparatus according to claim 1, wherein, in a case where the use environment of the image processing apparatus is not uniquely estimated, the one or more processors and the one or more memories further cooperate to cause the image processing apparatus to display, on the screen, both a second use environment estimated from among the plurality of use environments and the use environment estimated from among the plurality of use environments.

3. The image processing apparatus according to claim 2, wherein the one or more processors and the one or more memories further cooperate to cause the image processing apparatus to issue a notification of information indicating that the use environment of the image processing apparatus is not uniquely estimated.

4. The image processing apparatus according to claim 1, wherein, in a case where the use environment of the image processing apparatus is not uniquely estimated, the one or more processors and the one or more memories further cooperate to cause the image processing apparatus to display, in the second object, two or more use environments, of the plurality of use environments, obtained as a result of the estimation in different display forms from use environments other than the two or more use environments.

5. The image processing apparatus according to claim 4, wherein the two or more use environments are displayed in a more highlighted display form than the use environments other than the two or more use environments.

6. The image processing apparatus according to claim 1, wherein the plurality of use environments includes at least two of: an in-house intranet environment, an Internet direct connection environment, an Internet inhibition environment, and a teleworking environment.

7. The image processing apparatus according to claim 1, wherein the one or more processors and the one or more memories further cooperate to cause the image processing apparatus to acquire a Domain Name System (DNS) server address, a default gateway address, and a Dynamic Host Configuration Protocol (DHCP) server address as the address of the external device acquired by the image processing apparatus,
wherein the plurality of use environments includes at least a teleworking environment, and
wherein, in a case where the acquired DNS server address, the acquired default gateway address, and the acquired DHCP server address indicate a common address, the one or more processors and the one or more memories further cooperate to cause the image processing apparatus to estimate that the use environment of the image processing apparatus is the teleworking environment.

8. A method comprising:
displaying, on a screen, a first object for receiving an instruction to estimate a use environment of an image processing apparatus from among a plurality of use environments and a second object including the plurality of use environments for receiving a selection of a use environment from among the plurality of use environments;
receiving the instruction to estimate a use environment of the image processing apparatus from among the plurality of use environments by use of the first object;
estimating a use environment of the image processing apparatus from among the plurality of use environments based on an address of an external device acquired by the image processing apparatus;
displaying, on the screen, the use environment estimated from among the plurality of use environments in addition to the first object for receiving the instruction to estimate a use environment from among the plurality of use environments and the second object including the plurality of use environments for receiving the selection of a use environment from among the plurality of use environments;

receiving the selection of a use environment from among the plurality of use environments by using the second object; and setting values corresponding to the selected use environment to the image processing apparatus.

9. A non-transitory computer-readable storage medium storing computer-executable instructions that, when executed by an image processing apparatus, cause the image processing apparatus to perform a method comprising:

displaying, on a screen, a first object for receiving an instruction to estimate a use environment of an image processing apparatus from among a plurality of use environments and a second object including the plurality of use environments for receiving a selection of a use environment from among the plurality of use environments;

receiving the instruction to estimate a use environment of the image processing apparatus from among the plurality of use environments by use of the first object;

estimating a use environment of the image processing apparatus from among the plurality of use environments based on an address of an external device acquired by the image processing apparatus; and displaying, on the screen, the use environment estimated from among the plurality of use environments in addition to the first object for receiving the instruction to estimate a use environment from among the plurality of use environments and the second object including the plurality of use environments for receiving the selection of a use environment from among the plurality of use environments;

receiving the selection of a use environment from among the plurality of use environments by using the second object; and setting values corresponding to the selected use environment to the image processing apparatus.

\* \* \* \* \*